United States Patent
Arai et al.

(10) Patent No.: US 7,286,698 B2
(45) Date of Patent: Oct. 23, 2007

(54) CALIBRATION PATTERN UNIT

(75) Inventors: Kazuhiko Arai, Hachioji (JP); Akio Kosaka, Hachioji (JP); Takashi Miyoshi, Atsugi (JP); Kazuhiko Takahashi, Hachioji (JP); Hidekazu Iwaki, Hachioji (JP)

(73) Assignee: Olympus Corporation, Tokyo (JP)

( * ) Notice: Subject to any disclaimer, the term of this patent is extended or adjusted under 35 U.S.C. 154(b) by 803 days.

(21) Appl. No.: 10/650,590

(22) Filed: Aug. 28, 2003

(65) Prior Publication Data
US 2004/0042649 A1  Mar. 4, 2004

(30) Foreign Application Priority Data
Aug. 29, 2002  (JP) .............................. 2002-251634

(51) Int. Cl.
*G06K 9/00*  (2006.01)

(52) U.S. Cl. ...................... 382/154; 345/419; 356/401; 356/603; 382/203

(58) Field of Classification Search ................ 345/419; 356/401, 601, 603, 623; 382/154, 203
See application file for complete search history.

(56) References Cited

U.S. PATENT DOCUMENTS

| | | | |
|---|---|---|---|
| 6,341,016 B1 * | 1/2002 | Malione | ..................... 356/603 |
| 6,917,702 B2 * | 7/2005 | Beardsley | ..................... 382/154 |
| 7,062,861 B2 * | 6/2006 | O'Mahony et al. | ............ 33/286 |
| 7,138,645 B2 * | 11/2006 | Arai et al. | ................ 250/559.1 |
| 2004/0042649 A1 * | 3/2004 | Arai et al. | ................... 382/154 |
| 2004/0044496 A1 * | 3/2004 | Arai et al. | ................... 702/155 |

FOREIGN PATENT DOCUMENTS

| | | |
|---|---|---|
| EP | 1 193 646 A2 | 4/2002 |
| FR | 2 835 603 | 8/2003 |
| JP | 5-256627 | 10/1993 |
| JP | 09-170914 | 6/1997 |
| JP | 11-166818 | 6/1999 |
| JP | 2001-082941 | 3/2001 |
| JP | 2003-42726 | 2/2003 |
| WO | WO 01/74266 A1 | 10/2001 |

* cited by examiner

*Primary Examiner*—Gregory M Desire
(74) *Attorney, Agent, or Firm*—Scully, Scott, Murphy & Presser, P.C.

(57) ABSTRACT

A calibration pattern unit which obtains correction information of an imaging system by imaging at the imaging system comprises a calibration pattern which has a known geometric pattern formed on a plurality of three-dimensionally arranged planes, and a relative position and posture fixing section which fixes relative position and posture between the calibration pattern and the imaging system.

3 Claims, 6 Drawing Sheets

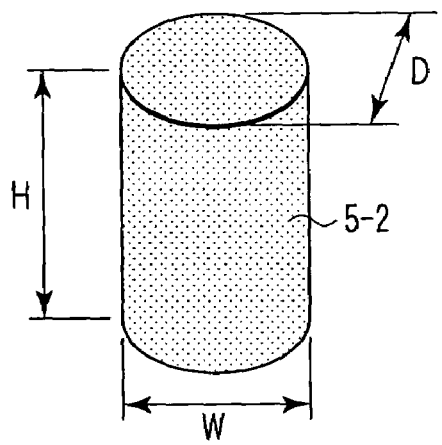
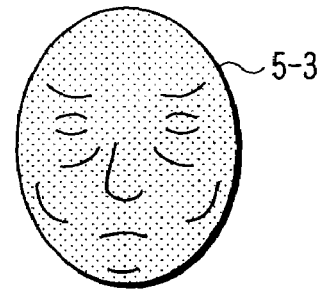
F I G. 4    F I G. 5
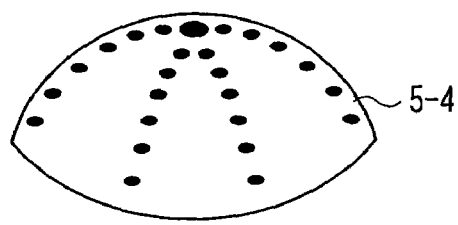
F I G. 6
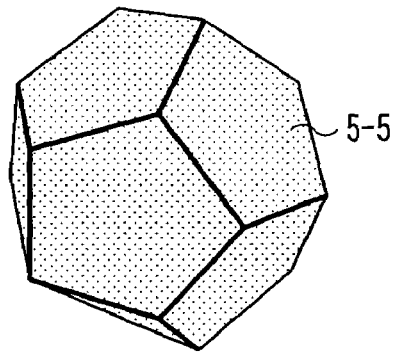
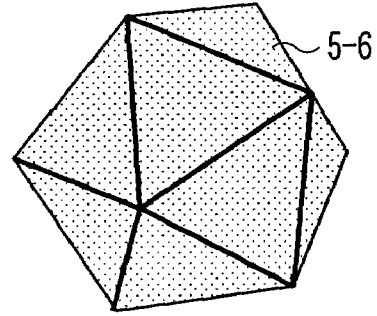
F I G. 7    F I G. 8

CALIBRATION PATTERN UNIT

CROSS-REFERENCE TO RELATED APPLICATIONS

This application is based upon and claims the benefit of priority from the prior Japanese Patent Application No. 2002-251634, filed Aug. 29, 2002, the entire contents of which are incorporated herein by reference.

BACKGROUND OF THE INVENTION

1. Field of the Invention

The present invention relates to a calibration pattern unit which is used to obtain correction information of an imaging system.

2. Description of the Related Art

Various calibration patterns used to obtain correction information of the imaging system have conventionally been presented. For example, Jpn. Pat. Appln. KOKAI Publication No. 11-166818 presents a technology for using a calibration pattern in which a known geometric pattern is drawn on a flat plate, and obtaining correction information of an imaging system by changing a relative distance between the pattern and the imaging system. Jpn. Pat. Appln. KOKAI Publication No. 2001-82941 presents a technology for constituting a calibration pattern by describing similar geometric patterns on surfaces of a corner cube structure, and obtaining correction information of an imaging system.

BRIEF SUMMARY OF THE INVENTION

According to a first aspect of the present invention, there is provided a calibration pattern unit which obtains correction information of an imaging system by imaging at the imaging system, the unit comprising:

a calibration pattern in which a predetermined pattern is formed on one of a plurality of three-dimensionally arranged planes and one or more curved surfaces; and a relative position and posture fixing section which fixes relative position and posture between the calibration pattern and the imaging system.

According to a second aspect of the present invention, there is provided a calibration pattern unit which obtains correction information of an imaging system by imaging at the imaging system, the unit comprising:

one of a plurality of three-dimensionally arranged planes and one or more curved surfaces; and a calibration pattern in which a predetermined pattern is formed on the one of a plurality of three-dimensionally arranged planes or one or more curved surfaces and in a range where a shape is substantially similar to an object imaged by the imaging system.

According to a third aspect of the present invention, there is provided a calibration pattern unit which obtains correction information of an imaging system by imaging at the imaging system, the unit comprising:

a calibration pattern in which a predetermined pattern is formed on one of a plurality of three-dimensionally arranged planes and one or more curved surfaces; and an imaging area instruction section configured to instruct an area to be imaged when the calibration pattern is imaged.

According to a fourth aspect of the present invention, there is provided a calibration pattern unit which obtains correction information of an imaging system by imaging at the imaging system, the unit comprising:

a calibration pattern in which a predetermined pattern is formed on one of a plurality of three-dimensionally arranged planes and one or more curved surfaces; and an imaging posture instruction section configured to instruct a posture of the imaging system with respect to the calibration pattern.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4 is a view showing a calibration pattern unit according to a second embodiment of the present invention;

FIG. 5 is a modification example of the calibration pattern unit of the second embodiment;

FIG. 6 is a perspective view showing a calibration pattern unit according to a third embodiment of the present invention;

FIG. 7 is a view showing a first modification example of the calibration pattern unit of the third embodiment;

FIG. 8 is a view showing a second modification example of the calibration pattern unit of the third embodiment;

DETAILED DESCRIPTION OF THE INVENTION

Before each embodiment of a calibration unit of the present invention is described in detail, explanation will be made of an example of a known geometric pattern which is a predetermined pattern drawn on a calibration pattern of the calibration pattern unit. The example of the known geometric pattern is common to all the embodiments.

Figure 1:
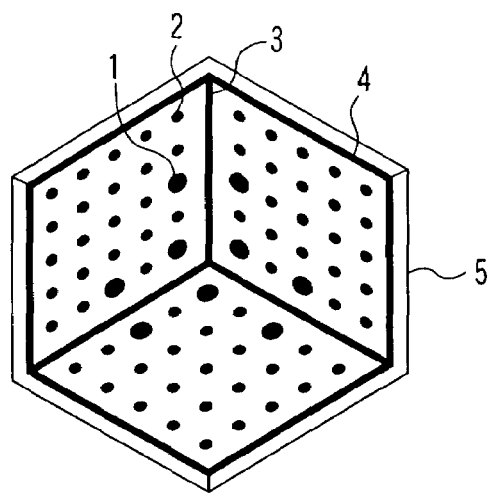
FIG. 1 is a view illustrating a calibration pattern.

That is, as shown in FIG. 1, a known geometric pattern constituted of pluralities of large and small black circles 1 and 2, a surface crossline 3 and an outer boundary line 4 is drawn on three flat plate calibration pattern drawn sections to constitute a calibration pattern 5. The large and small black circles 1, 2, the surface crossline 3 and the outer boundary line 4 constituting the known geometric pattern, i.e., pattern components, are drawn at constant intervals by a certain rule. The intervals and the rule can be optionally selected depending on necessary imaging system correction information, and the invention imposes no restrictions. For example, the black circle may be a cross mark or a black and white double circle. The black circles may be differentiated from each other by color information in place of size. The surface crossline 3 and the outer boundary line 4 may be broken lines. Additionally, there are no specific restrictions on areas. The calibration pattern drawn section may be a curved surface or a combination of a plurality of planes other than three.

In the drawings referred to in the following description of each embodiment, a known geometric pattern similar to the above is actually drawn on the calibration pattern drawn section. However, to simplify the drawings, only a place of a surface where the known geometric pattern is drawn is shown by hatching when necessary. This hatched surface is set as a pattern drawn surface.

The entire calibration pattern where such a known geometric pattern is drawn is represented by a calibration pattern 5, 5-1, 5-2 or the like common to all the embodiments. Further, in an example shown in FIG. 1, a calibration pattern 5 has a corner cube shape, which is not limitative of a shape in each of the following embodiments. In the example of FIG. 1, the known geometric pattern is drawn on an inner wall surface of the corner cube shape. However, the pattern may be drawn on an outer wall surface in accordance with an imaging angle.

As the imaging system of the invention to carry out calibration, various imaging systems such as a film camera, a digital camera, a video camera, a microscopic endoscope, a multiple-lens stereo camera, a pattern projection camera and a slit scan camera are available, and there are no restrictions on types.

Next, the preferred embodiments of the present invention will be described with reference to the accompanying drawings.

First Embodiment

Figure 2:
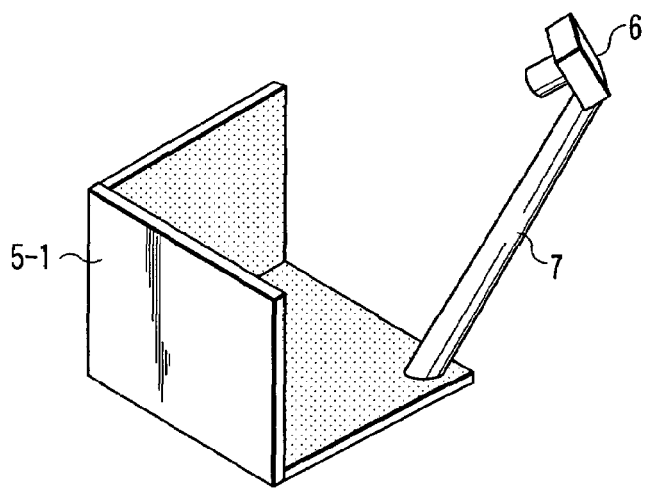
FIG. 2 is a perspective view showing a calibration pattern unit according to a first embodiment of the present invention.

As shown in FIG. 2, in a calibration pattern unit of a first embodiment of the present invention, an imaging system 6 is controlled in position and posture with respect to a calibration pattern 5-1 by a relative position and posture fixing section 7. The relative position and posture fixing section 7 may be completely fixed to the calibration pattern 5-1, or detachably attached by a screw or the like. An adjustment mechanism such as a camera platform may be installed to deal with fine adjustment of a position and a posture, and mounting of a plurality of imaging systems. Any degree of adjustment freedom may be provided as long as a position and a posture which have been defined are held by a fixture such as a screw after all.

Figure 3:
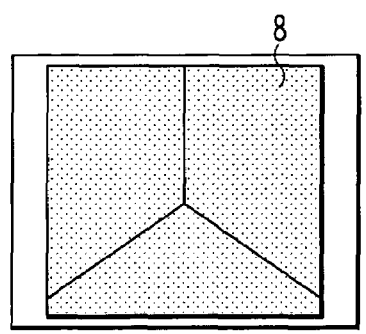
FIG. 3 is a view showing an appearance of a calibration pattern of the calibration unit of the first embodiment observed through a finder of an imaging system.

In the calibration unit of such a configuration, when the calibration pattern 5-1 is observed through a not-shown finder of the imaging system 6, an image 8 similar to that shown in FIG. 3 is obtained.

Good calibration pattern imaging depends on calibration intension, a shape of the calibration pattern, and a situation of an imaging environment or the like. Normally, there are optimal values for a position of a boundary line for carrying out good calibration, a size of a point to be observed, an observation direction of the boundary line, an area size where a pattern drawn surface is imaged etc. These are control conditions after all for imager magnification and an imaging angle, i.e., position and posture between the calibration pattern 5-1 and the imaging system 6, when the calibration pattern 5-1 is imaged by the imaging system 6. A mechanism of the relative position and posture fixing section 7 is set to satisfy these conditions. Thus, by installing the imaging system 6 on the relative position and posture fixing section 7 disposed on the calibration pattern 5-1, an operator can carry out good calibration pattern imaging without being bothered by adjustment each time.

Second Embodiment

Next, a second embodiment of the present invention will be described. A calibration pattern unit of the second embodiment is used to calibrate an imaging system so that good imaging can be carried out by the imaging system which images a real cylindrical object.

Thus, as shown in FIG. 4, the calibration pattern unit of the second embodiment has a calibration pattern 5-2 which is substantially similar in shape and size to the real object. That is, a ratio between the calibration pattern 5-2 and the object image by the imaging system in width (W), height (H) and depth (D) is set to 1.0. The calibration pattern 5-2 is imaged under conditions similar to imaging magnification and angle conditions when the real object is actually imaged.

That is, for example, for the purpose of three-dimensionally reconfiguring the real object, calibration imaging is carried out by using a calibration pattern which has such a roughly similar shape. Accordingly, it is possible to obtain known point coordinate information in a tree-dimensional space corresponding to an image space to be corrected at minimum. Therefore, a load of calibration calculation can be reduced and, at the same time, highly accurate calibration data from which unnecessary points easily including noise are removed can be obtained.

FIG. 5 is a view showing a modification example of the calibration pattern unit of the second embodiment of the present invention. That is, the calibration pattern unit of the modification example has a calibration pattern 5-3 which has a surface shape based on an average human face shape to match imaging carried out to three-dimensionally reconfigure a human face.

As in the case of the second embodiment, by executing calibration imaging under imaging conditions similar to those of image magnification, an imaging angle etc., to image a real human, calibration pattern imaging best suited to three-dimensional reconfiguration of the human face is carried out.

Third Embodiment

Next, a third embodiment of the present invention will be described. As shown in FIG. 6, a calibration pattern unit of the third embodiment is configured by describing a calibration pattern 5-4 on a surface of a part of a bowl-shaped, i.e., roughly spherical surface.

In this case, a pattern point-symmetrical nearly to a center of the surface is drawn as shown. Accordingly, if imaging of the calibration pattern 5-4 is tried nearly at a center of a field angle of an imaging system which carries out calibration, it is possible to carry out good and always uniform calibration imaging without little dependence on an imaging direction.

Each of FIGS. 7 and 8 is a view showing a modification example of the calibration pattern unit of the third embodiment. Here, the first modification example of FIG. 7 is a calibration pattern unit which comprises a calibration pattern 5-5 having a known geometric pattern drawn on each surface of a regular dodecahedron. The second modification example of FIG. 8 is a calibration pattern unit which comprises a calibration pattern 5-6 having a known geometric pattern drawn on each surface of a regular dodecahedron.

According to the modification examples, as in the case of the third embodiment, nearly uniform calibration pattern observation can be carried out without any dependence on an imaging direction of the calibration pattern, and a calibration pattern constituted geometrically easily can be formed.

As shown by the third embodiment, and the first and second modification examples thereof, various modifications can be made of the embodiment. As other polyhedrons to be used, there are a regular tetrahedron, a regular hexahedron, an elliptic ball, a polyhedron combining parts thereof or a plurality of regular polyhedrons of a kind, a polyhedron combining a plurality of regular polyhedrons of different kinds, and a polyhedron having a pattern drawn not on an outer wall surface but on an inner wall surface. Thus, there are no restrictions on shapes.

Fourth Embodiment

Next, a fourth embodiment of the present invention will be described.

Figure 9:
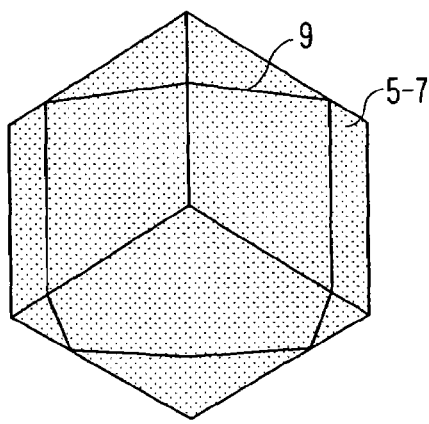
FIG. 9 is a view showing a calibration pattern unit according to a fourth embodiment of the present invention.

If the calibration pattern 5 of the corner cube type shown in FIG. 1 is imaged well, a result becomes similar to that shown in FIG. 3. In this case, if a boundary of an area included in a field angle is drawn, a result becomes similar to that shown in FIG. 9. Thus, in a calibration pattern unit of the fourth embodiment, a boundary line 9 is drawn in an actual imaging instruction section on a calibration pattern 5-7.

Thus, when imaging is carried out by an imaging system, the imaging instruction section (boundary line 9) adjusts position and posture between the imaging system and the calibration pattern 5-7 to carry out imaging fully through a not-shown finder of the imaging system. Therefore, it is possible to carry out ideal calibration pattern imaging.

Figure 10:
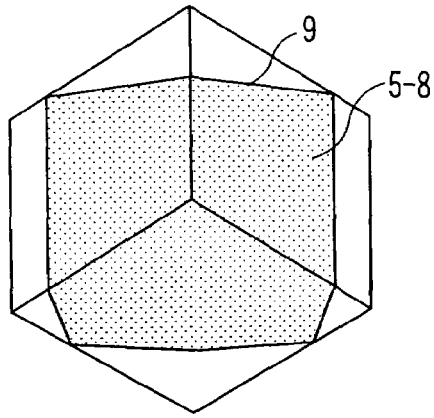
FIG. 10 is a view showing a first modification example of the calibration pattern unit of the fourth embodiment.

Various modifications can be made of the fourth embodiment. For example, in a first modification example of FIG. 10, an area itself where a calibration pattern 5-8 is drawn is set as an imaging instruction section. By such a configuration, a minimum necessary pattern is drawn in an area to be imaged.

Figure 11:
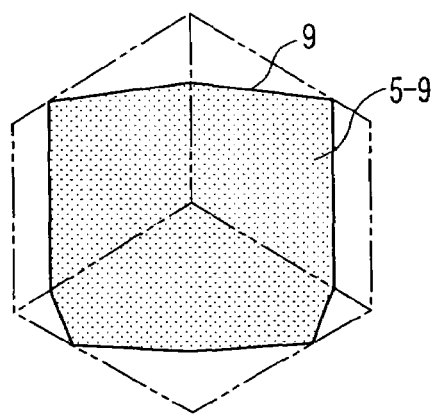
FIG. 11 is a view showing a second modification example of the calibration pattern unit of the fourth embodiment.

As shown in FIG. 11, a second modification example is that a boundary of a calibration pattern 5-9 is a boundary of a structure of a calibration pattern unit, constituting an imaging instruction section. By such a configuration, a calibration pattern unit having a minimum necessary size can be constituted, and it is possible to provide a calibration pattern unit excellent in transportation and storage.

Figure 12:
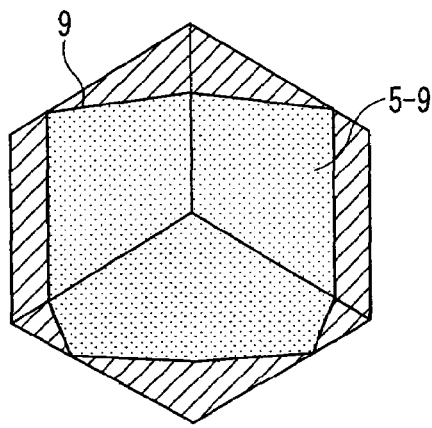
FIG. 12 is a view showing a third modification example of the calibration pattern unit of the fourth embodiment.

FIG. 12 is a view showing a third modification example. That is, the inside and the outside of a calibration pattern 5-9 are colored differently to constitute an imaging instruction section. It is possible to provide a highly recognizable imaging instruction section.

Figure 13:
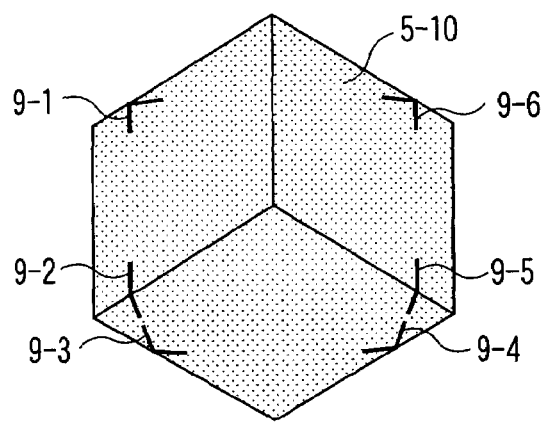
FIG. 13 is a view showing a fourth modification example of the calibration pattern unit of the fourth embodiment.

As shown in FIG. 13, a fourth modification example is a calibration pattern unit where so-called "register marks" 9-1 to 9-6 are drawn on a calibration pattern 5-10 at parts of a boundary line 9, e.g., at corners of the boundary line, to constitute an imaging instruction section. In such a calibration pattern unit, the imaging instruction section can be drawn to be easily recognized in a minimum necessary area.

Various shapes can be employed for the imaging instruction section, and there are no restrictions on the shape.

Fifth Embodiment

Figure 14:
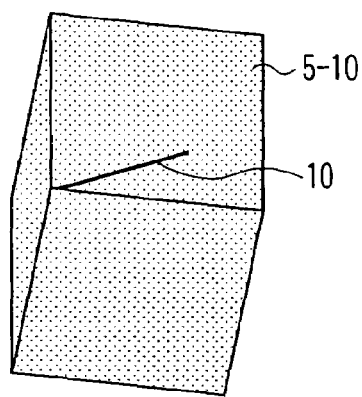
FIG. 14 is a perspective view showing a calibration pattern unit according to a fifth embodiment.

Next, a fifth embodiment of the present invention will be described. As shown in FIG. 14, the fifth embodiment provides a calibration pattern unit where a bar-shaped imaging instruction section 10 is installed at a corner of a calibration pattern 5-11 drawn on an inner wall surface of a corner cube shape. This imaging instruction section 10 instructs an optical axis of a not-shown imaging system. That is, the imaging instruction section 10 is installed with respect to the calibration pattern 5-11 so that by matching the imaging instruction section 10 preset in direction with the optical axis of the imaging system, the calibration pattern 5-11 can be imaged as a nearly uniform pattern distribution around the optical axis.

An operator pays attention so that the imaging instruction section 10 can be observed substantially as a point while observing the bar-shaped imaging instruction section 10 through a not-shown finder of the imaging system, and carries out imaging so that the imaged calibration pattern 5-11 can be set within a proper field angle. Accordingly, the calibration pattern can be imaged in a proper imaging direction where a rotational direction component around the optical axis is removed.

Figure 15:
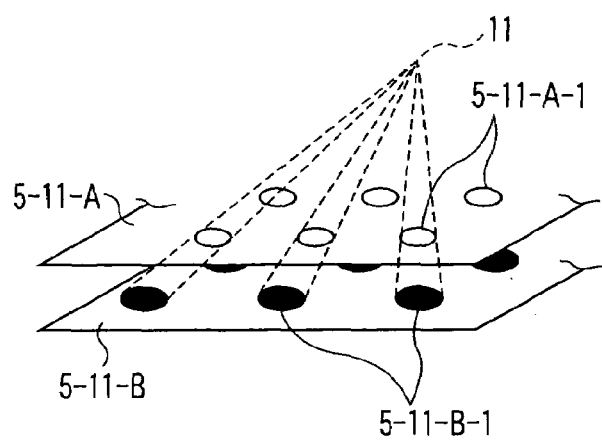
FIG. 15 is a view showing a modification example of the calibration pattern unit of the fifth embodiment.

By referring to FIG. 15, a first modification example of the fifth embodiment of the present invention will be described. FIG. 15 shows a surface cut out of the calibration pattern 5-11 of the corner cube type shown in FIG. 14. That is, this surface is constituted of two platelike calibration patterns 5-11-A and 5-11-B. A hole 5-11-A-1 is bored at least on a part of the calibration pattern 5-11-A. A black elliptic shape 5-11-B-1 is drawn in a position on the calibration pattern 5-11-B observable through the hole 5-11-A-1 from a predetermined imaging position 11. Such a configuration is set for all the drawn surfaces of the corner cube type calibration pattern.

When the calibration unit of the above configuration is used, the calibration pattern is imaged while a position and a posture of a not-shown imaging system are adjusted so that the black elliptic pattern can be imaged best as a whole when the imaging is carried out from the predetermined imaging position 11. Thus, it is possible to instruct an imaging position and a posture most suited to calibration pattern imaging.

Sixth Embodiment

Next, a sixth embodiment of the present invention will be described by referring to FIGS. 16 to 19.

Figure 16:
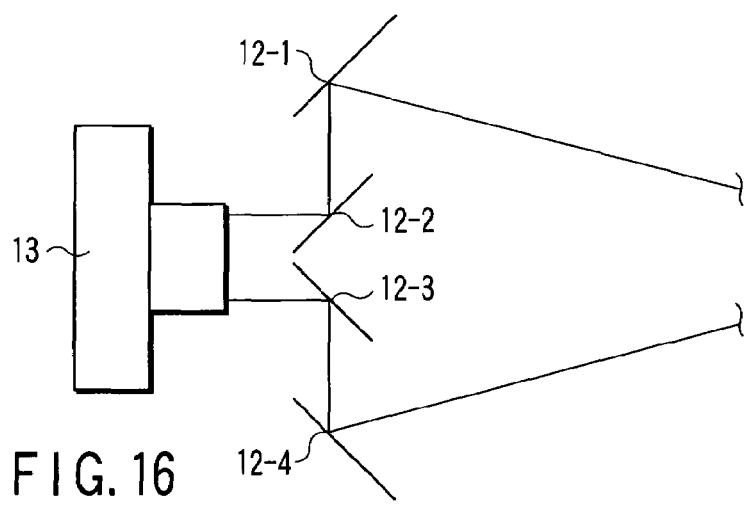
FIG. 16 is a view showing a configuration of an imaging section of a calibration device to which a calibration pattern unit of a sixth embodiment of the present invention is applied.

The embodiment provides a calibration pattern unit used by a calibration device which has an imaging section similar to that shown in FIG. 16. That is, in the imaging section, a stereo optical system constituted of four flat mirrors 12-1, 12-2, 12-3, 12-4 is set in a predetermined position with respect to an imaging system 13. Here, a position and posture relation between the stereo optical system and the imaging system 13 is fixed by a not-shown member for fastening.

Figure 17:
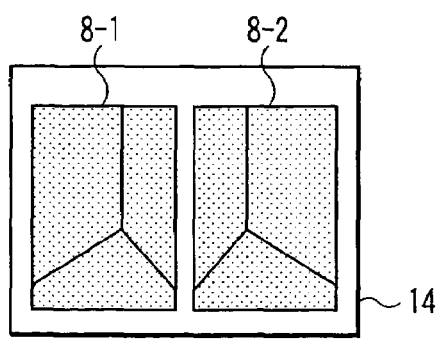
FIG. 17 is a view showing an image of a calibration pattern observed through a finder of an imaging system in the imaging section of the configuration of FIG. 16.
Figure 18:
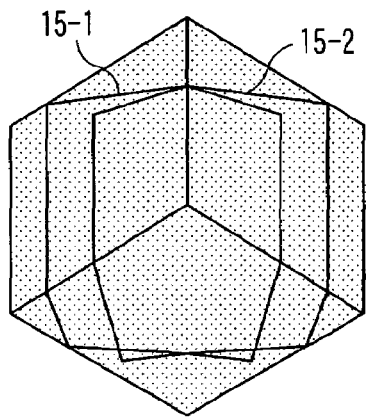
FIG. 18 is a view illustrating a portion corresponding to the image shown in FIG. 17 on the calibration pattern unit.

For example, when a calibration pattern similar to that shown in FIG. 18 is imaged through the stereo optical system, the calibration pattern is observed through a not-shown finder of the imaging system 13 as shown in FIG. 17. In FIG. 17, a reference numeral 8-1 denotes an image formed through the flat mirrors 12-1 and 12-2 on the imaging system 13, and similarly a reference numeral 8-2 denotes an image formed through the flat mirrors 12-4 and 12-3 on the imaging system 13. That is, the imaging section of the calibration device is configured so that by sizes and arrangement positions of the flat platelike mirrors 12-1 to 12-4 and removal of unnecessary imaging areas by the not-shown member for fastening, when imaging is carried out by the imaging system 13 without any stereo optical systems similar to the above, images 8-1 and 8-2 imaged through the stereo optical system can be present in a maximum imaging area 14 observable through the finder. In other words, a plurality of imaging systems are virtually formed by the stereo optical system and the imaging system 13.

Virtual frame lines 15-1 and 15-2 on the calibration pattern of FIG. 18 indicate areas of which portions on the real calibration pattern outer frames on the finder are equivalent to when the images 8-1 and 8-2 are observed in best positions in calibration pattern imaging. Conversely, if the frame lines 15-1, 15-2 are actually drawn as imaging instruction sections on the calibration pattern, and the operator can image the calibration pattern so that imaging can fully reach the boundary of the images 8-1, 8-2 on the finder, it is possible to carry out best calibration pattern imaging as a result.

Figure 19:
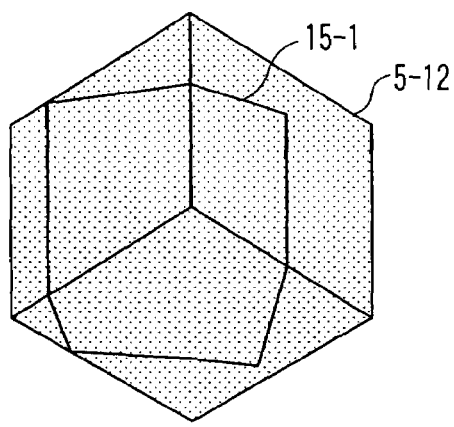
FIG. 19 is a view showing the calibration pattern unit of the sixth embodiment.

Thus, as shown in FIG. 19, the calibration pattern unit of the sixth embodiment comprises a calibration pattern 5-13 where the boundary line of only the frame line 15-1 side is drawn as an imaging instruction section. That is, since stereo imaging can be carried out only for overlapped area of the frame lines 15-1, 15-2, it is only necessary to secure at least the overlapped area. In the embodiment, the boundary line of only the frame line 15-1 side is set as the imaging instruction section as it is functionally enough for only one frame line.

Accordingly, a correct calibration imaging angle can be set by paying attention to one of the images which are imaged through the stereo optical system and passed through different optical paths.

Figure 20:
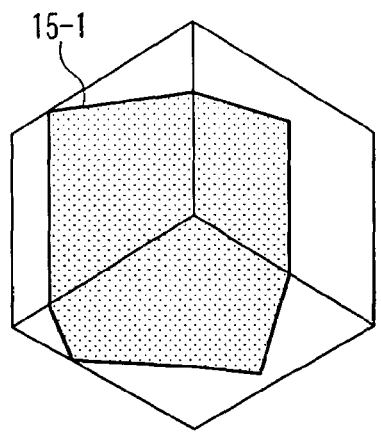
FIG. 20 is a view showing a first modification example of the calibration pattern unit of the sixth embodiment.

FIG. 20 is a view showing a first modification example of the sixth embodiment of the present invention. According to the first modification example, an imaging instruction section is set by not describing a pattern outside the boundary (frame line 15-1) not to be imaged. Thus, it is possible to reduce useless pattern drawn areas.

Figure 21:
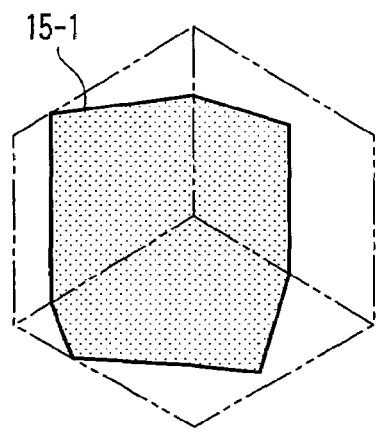
FIG. 21 is a view showing a second modification example of the calibration pattern unit of the sixth embodiment.

As a second modification example of the sixth embodiment, in FIG. 21, since the outside of the boundary (frame line 15-1) is not imaged, a structure of the calibration pattern unit itself becomes a boundary. Thus, a calibration pattern side becomes minimum necessary, and it is possible to provide a calibration pattern unit excellent in portability and storage.

Figure 22:
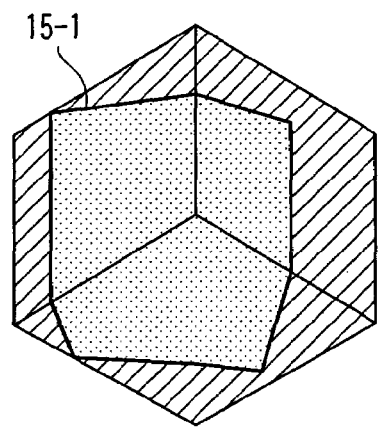
FIG. 22 is a view showing a third modification example of the calibration pattern unit of the sixth embodiment.

As shown in FIG. 22, a third modification example of the sixth embodiment is a calibration pattern unit which has a calibration pattern where the substrates of the inside and the outside of the boundary (frame line 15-1) are colored differently to constitute an imaging instruction section. Accordingly, visibility of imaging angle adjustment can be increased.

Figure 23:
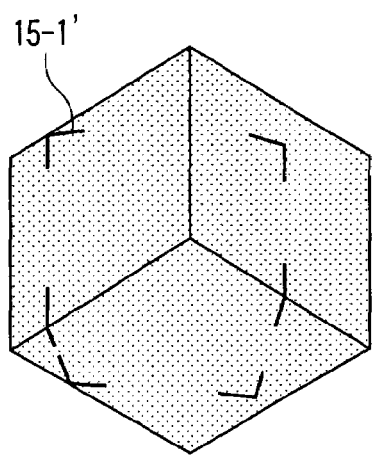
FIG. 23 is a view showing a fourth modification example of the calibration pattern unit of the sixth embodiment.
Figure 24:
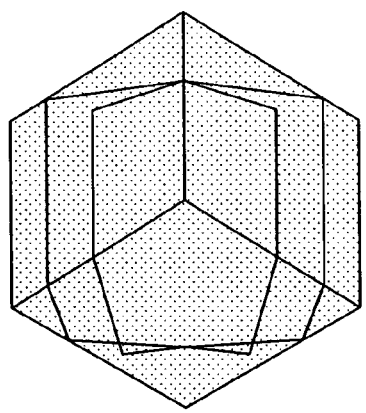
FIG. 24 is a view corresponding to FIG. 19 when an imaging instruction section corresponding to both images of the observed calibration pattern shown in FIG. 17 is disposed.
Figure 25:
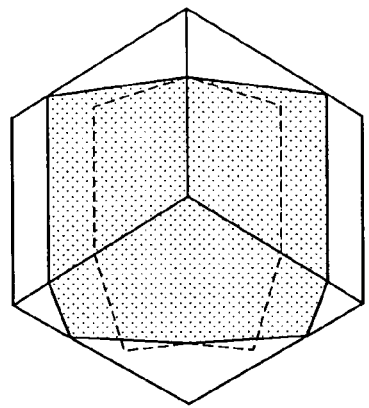
FIG. 25 is a view corresponding to FIG. 20 when an imaging instruction section corresponding to both images of the observed calibration pattern shown in FIG. 17 is disposed.
Figure 26:
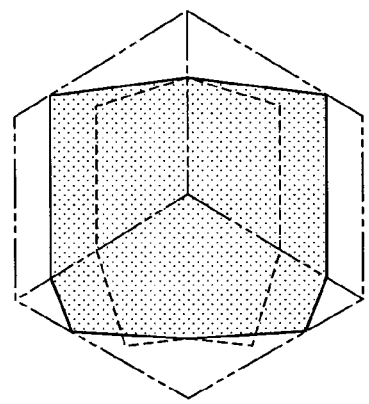
FIG. 26 is a view corresponding to FIG. 21.
Figure 27:
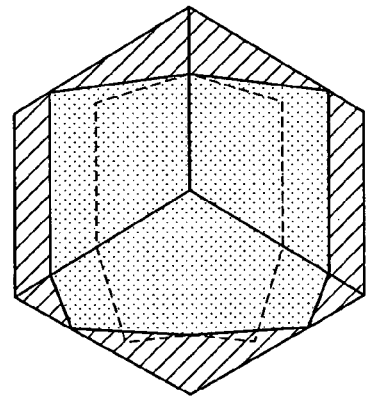
FIG. 27 is a view corresponding to FIG. 22 when an imaging instruction section corresponding to both images of the observed calibration pattern shown in FIG. 17 is disposed.
Figure 28:
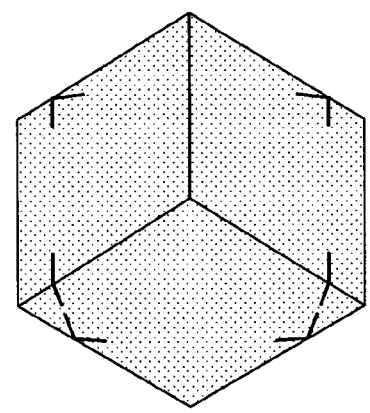
FIG. 28 is a view corresponding to FIG. 23 when an imaging instruction section corresponding to both images of the observed calibration pattern shown in FIG. 17 is disposed.

FIG. 23 is a view showing a fourth modification example of the sixth embodiment, which is a calibration pattern unit having a calibration pattern where an imaging instruction section is descried in a so-called "register mark" form at each corner 15-1' of the not-shown boundary (frame line 15-1). According to the fourth modification example, a guidance function can be provided by reducing an influence of information deterioration on the original calibration pattern.

Figure 29:
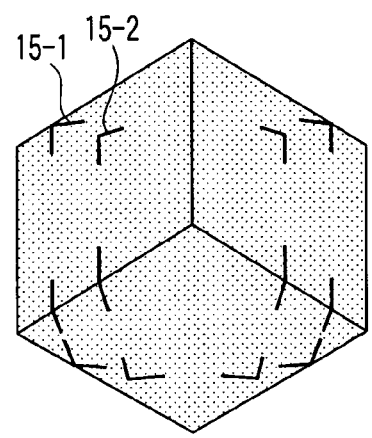
FIG. 29 is a view corresponding to FIG. 23 when an imaging instruction section corresponding to both images of the observed calibration pattern shown in FIG. 17 is disposed.

In the first to fourth modification examples of the sixth embodiment, the imaging instruction section is disposed for only one of the images which are divided into two by the stereo optical system and imaged. However, imaging instruction sections can be disposed for both of these images. FIGS. 24 to 28 show examples of imaging instruction sections disposed for both images corresponding to the sixth embodiment, and the first to fourth modification examples of the sixth embodiment. For the fourth modification example, in place of the configuration of FIG. 28, a configuration of FIG. 29 may be employed.

Thus, by disposing imaging instruction sections for both images, calibration pattern imaging can be effectively carried out when more accuracy is required, e.g., in installation of the stereo optical system with respect to the optical system. Other operations are the same as in the sixth embodiment, and the first to fourth modification examples of the sixth embodiment described above, and hence the explanation of them is omitted.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A calibration pattern unit which obtains correction information of an imaging system by imaging at the imaging system, the unit comprising:
    a calibration pattern in which a predetermined pattern is formed on one of a plurality of three-dimensionally arranged planes and one or more curved surfaces; and
    an imaging area and posture instruction section configured to instruct an area of a boundary of a field angle to be imaged when the calibration pattern is imaged, to definitely determine a position and posture of the imaging system relative to the calibration pattern and a size of an imaging range, so that the calibration pattern can be imaged as large as possible in a field of view of observing the boundary.

2. The unit according to claim 1, wherein
    the unit comprises a plurality of imaging systems which enable imaging of the object from a plurality of view points, and
    the imaging area and posture instruction section corresponds to only one of the plurality of imaging systems.

3. The unit according to claim 1, wherein
    the unit comprises a plurality of imaging systems which enable imaging of the object from a plurality of view points, and
    the imaging area and posture instruction section corresponds to the plurality of imaging systems.

* * * * *